United States Patent
Imamura

(10) Patent No.: US 7,898,525 B2
(45) Date of Patent: Mar. 1, 2011

(54) ELECTRONIC DEVICE INCLUDING DIGITAL TUNER UNIT

(75) Inventor: Akira Imamura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1184 days.

(21) Appl. No.: 11/542,941

(22) Filed: Oct. 3, 2006

(65) Prior Publication Data

US 2007/0097082 A1 May 3, 2007

(30) Foreign Application Priority Data

Oct. 31, 2005 (JP) ............................. 2005-317145

(51) Int. Cl.
*G09G 5/00* (2006.01)
(52) U.S. Cl. .................. 345/168; 361/679.08
(58) Field of Classification Search .................. 345/168, 345/169; 361/679.02, 679.08
See application file for complete search history.

(56) References Cited

U.S. PATENT DOCUMENTS

2002/0051339 A1* 5/2002 Ohashi et al. ............... 361/687

FOREIGN PATENT DOCUMENTS

| JP | 277730 | 6/1990 |
|---|---|---|
| JP | 10124174 | 5/1998 |
| JP | 200075972 | 3/2000 |
| JP | 2001-044870 | 2/2001 |
| JP | 2001325045 | 4/2001 |
| JP | 200292576 | 3/2002 |
| JP | 2002108497 | 4/2002 |
| JP | 2003-179832 | 6/2003 |
| JP | 3097007 | 7/2003 |
| JP | 200494343 | 3/2004 |
| JP | 2004-282214 | 10/2004 |
| JP | 2005-100173 | 4/2005 |
| JP | 2005-190296 | 7/2005 |

OTHER PUBLICATIONS

Japanese Office Action dated Mar. 25, 2008 for application No. 2005317145, entitled Electronic Device Including Digital Tuner Unit. (English Translation).
Japanese Decision to Grant dated Jun. 17, 2008 for application No. 2005-317145 (U.S. Appl. No. 11/542,941), entitled Electronic Device Including Digital Tuner Unit (English Translation).

* cited by examiner

*Primary Examiner*—Regina Liang
(74) *Attorney, Agent, or Firm*—Blakely, Sokoloff, Taylor & Zafman LLP

(57) ABSTRACT

According to one embodiment, an electronic device includes a cabinet having an upper case and a lower case. The upper case has an upper wall, and a keyboard mounting section is provided on the upper case. The cabinet incorporates a main board. A connector is provided on the top surface of the main board. A sub-board equipped with a digital tuner unit composed of a plurality of components including a first component and a second component is inserted in the connector. The first component has the greatest height of all of the components and is mounted on the top surface of the sub-board so as to face the upper wall outside the longitudinal direction of the keyboard mounting section.

9 Claims, 3 Drawing Sheets

ELECTRONIC DEVICE INCLUDING DIGITAL TUNER UNIT

CROSS-REFERENCE TO RELATED APPLICATIONS

This application is based upon and claims the benefit of priority from Japanese Patent Application No. 2005-317145, filed Oct. 31, 2005, the entire contents of which are incorporated herein by reference.

BACKGROUND

1. Field

One embodiment of the invention relates to an electronic device including a digital tuner unit.

2. Description of the Related Art

Recently, most personal computers have included a terrestrial analog tuner unit for receiving terrestrial analog broadcast signals. Most recently, personal computers such as a notebook personal computer have been desired which are capable of watching and hearing programs of terrestrial digital broadcasting (ISDB-T), satellite broadcasting (BS), overseas digital broadcasting (e.g., DVB-T) and the like. The personal computers therefore have to include a digital tuner unit such as a terrestrial digital tuner unit.

For example, Jpn. Pat. Appln. KOKAI Publications Nos. 2004-282214 and 2001-044870 disclose a technique of equipping an AV device such as a TV set with a digital tuner unit. Generally, AV devices have no great constraints in their height direction.

Personal computers, especially notebook personal computers have a thin box-shaped cabinet as a main body. In order to incorporate a digital tuner unit in the cabinet of the notebook personal computer, the constraints in the height direction have to be taken into consideration. Recently, the cabinet has been required to decrease in thickness more greatly; however, it is difficult to incorporate a digital tuner unit in the cabinet with the requirement satisfaction.

BRIEF DESCRIPTION OF THE SEVERAL VIEWS OF THE DRAWINGS

A general architecture that implements various features of the invention will now be described with reference to the drawings. The drawings and their associated descriptions are provided to illustrate the embodiments of the invention and not to limit the scope of the invention.

DETAILED DESCRIPTION

Various embodiments according to the invention will be described hereinafter with reference to the accompanying drawings. In general, according to one embodiment of the invention, an electronic device is provided. The electronic device comprises a cabinet including a lower case and an upper case coupled to the lower case, the upper case having an upper wall and a keyboard mounting section on which a keyboard is mounted; a main board having a top surface and incorporated in the cabinet; a connector provided on the top surface of the main board; and a sub-board having a top surface and an undersurface and equipped with a digital tuner unit composed of a plurality of components including a first component and a second component, the sub-board having a connector portion which is inserted in the connector of the main board in parallel with each other, the first component having a greatest height of all of the components and being mounted on the top surface of the sub-board so as to face the upper wall outside a longitudinal direction of the keyboard mounting section.

Figure 1:
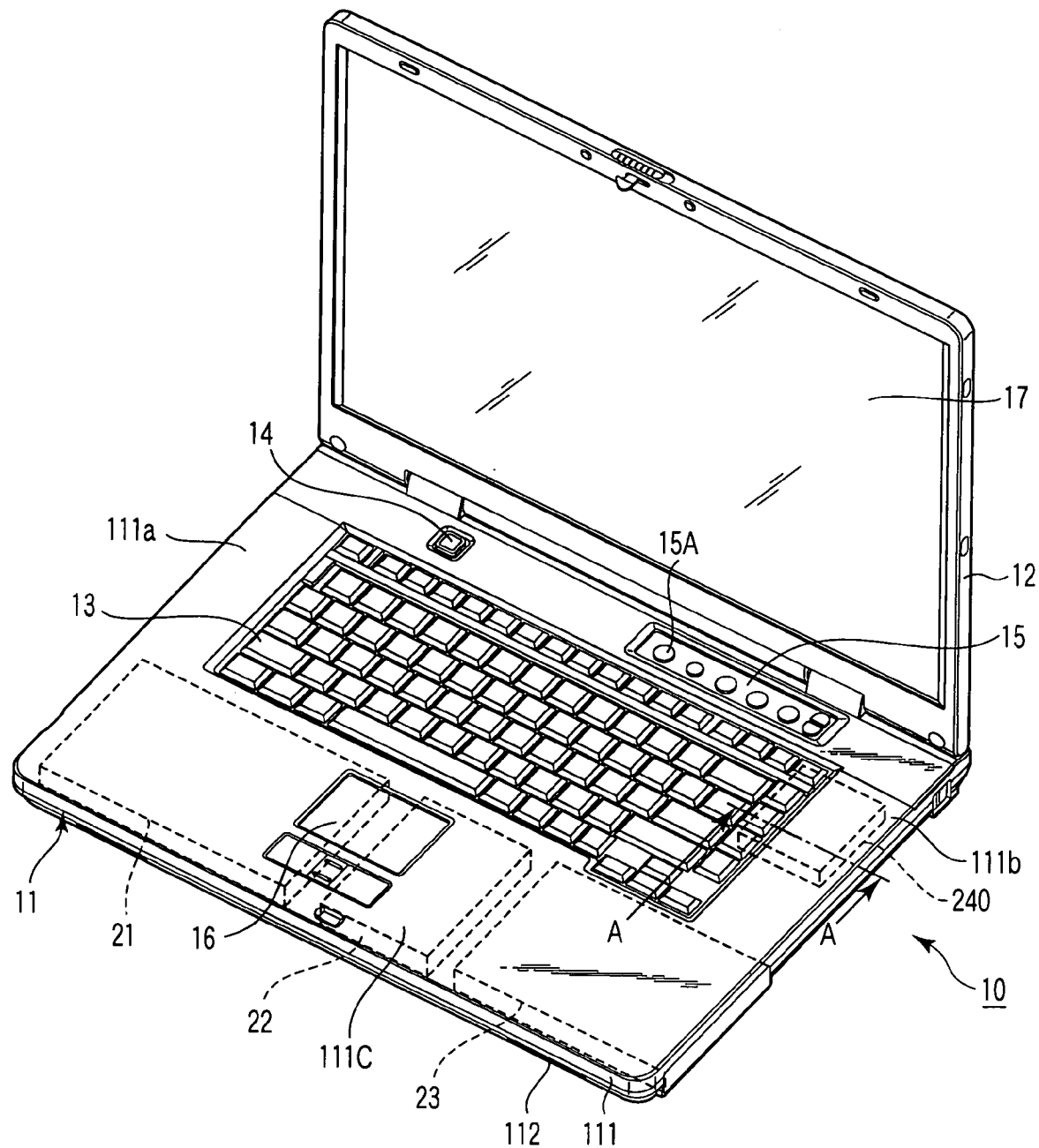
FIG. 1 is a perspective view of an exemplary outward appearance of a personal computer according to an embodiment of the invention.
Figure 2:
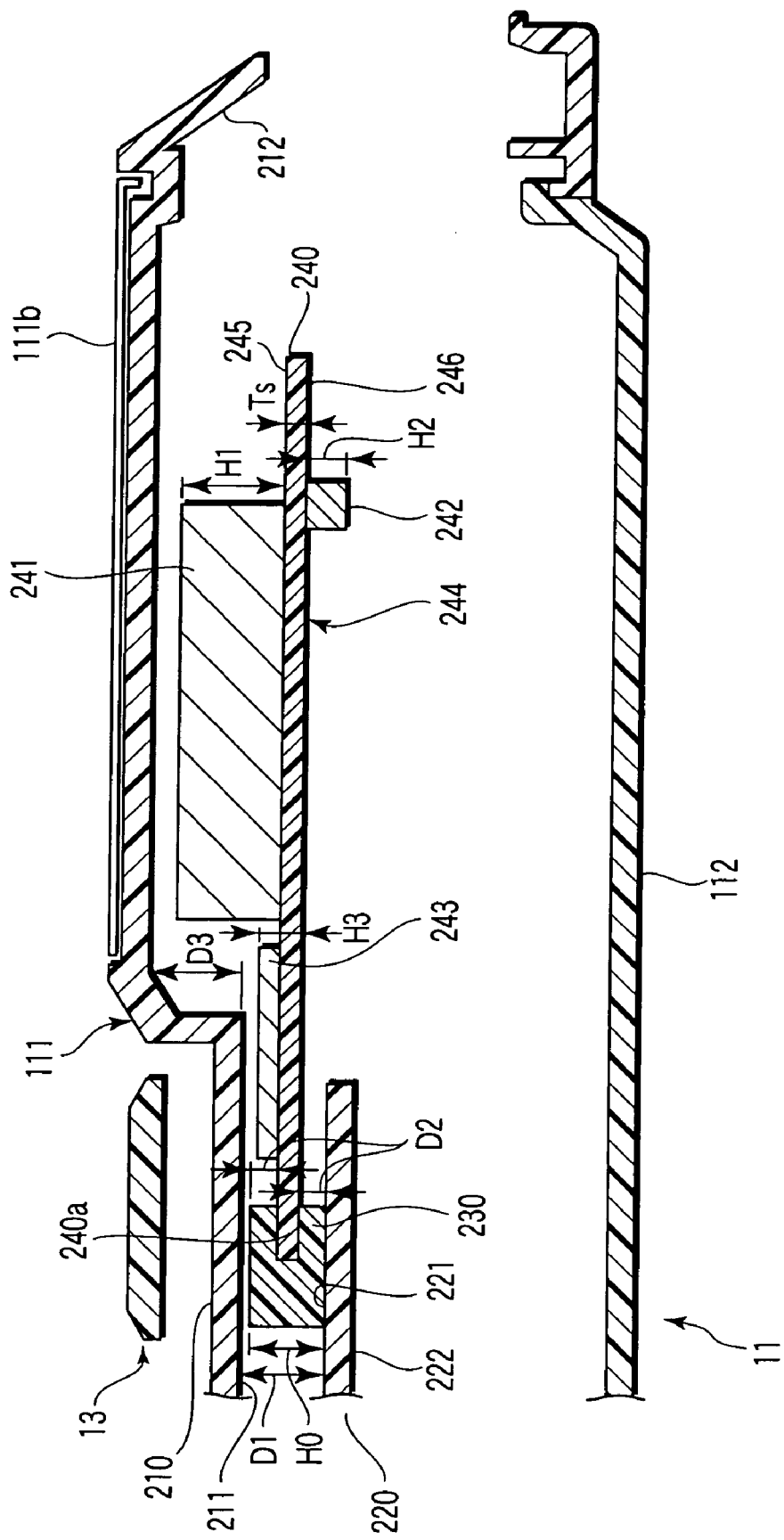
FIG. 2 is a sectional view of the main part of the personal computer, which is taken along line A-A of FIG. 1.

Referring first to FIGS. 1 and 2, an electronic device according to an embodiment of the invention will be described. The electronic device is implemented as, for example, a notebook personal computer 10.

FIG. 1 is a perspective view of the notebook personal computer 10 whose display unit is open. The computer 10 includes a cabinet 11 for the main body thereof and a display unit 12. The display unit 12 incorporates a display device that is configured by a thin film transistor liquid crystal display (TFT-LCD) 17. The display screen of the LCD 17 is located in almost the central part of the display unit 12. The LCD 17 has, for example, a 17-inch horizontally oriented screen (wide screen), and the size (resolution) of the screen is, for example, 1440×900 pixels.

The display unit 12 is attached to the cabinet 11 such that it can turn between its open position and closed position. The cabinet 11 is shaped like a thin box. The cabinet 11 has an upper case 111 and a lower case 112. The upper case 111 is coupled to the lower case 112.

A horizontally oriented keyboard 13 is provided in the middle back of the top surface of the cabinet 11 (or the surface of the upper case 111). The top surface of the cabinet 11 includes non-keyboard areas 111a and 111b outside the keyboard 13 and in the longitudinal direction of the keyboard 13. As described above, the LCD 17 has a 17-inch horizontally oriented screen and accordingly the non-keyboard areas 111a and 111b become relatively long.

A power button 14 for powering on/off the computer 10 and an input operation panel 15 are arranged on the top surface of the cabinet 11 and at the back of the keyboard 13. The input operation panel 15 includes at least one button 15A (a plurality of buttons 15A in this embodiment). The buttons 15A are used to play and stop an optical disk drive, control the luminance of the LCD 17 and the volume of a speaker, and the like.

The front half of the top surface of the cabinet 11 where the keyboard 13 is not provided, serves as a palm rest 111c. A touch pad 16 is provided in the central part of the palm rest 111c. A rechargeable battery 21, a hard disk drive (HDD) 22 and an optical disk drive (ODD) 23 are incorporated in the cabinet 11 so as to correspond to the palm rest 111c.

The cabinet 11 incorporates a sub-board 240 including a digital tuner unit 244 (see FIG. 2) such as a terrestrial digital tuner unit. The sub-board 240 is located in correspondence with, for example, the right one (111b) of the non-keyboard areas 111a and 111b on the top surface of the cabinet 11 (on the surface of the upper case 111).

FIG. 2 is a sectional view of the main part of the personal computer, which is taken along line A-A of FIG. 1. As shown in FIG. 2, the upper case 111 of the cabinet 11 includes an upper wall 211. The upper case 111 also includes a right-side section 212 and a left-side section (not shown), or a pair of side sections. A keyboard mounting section 210 is formed in the central part of the upper case 111. The keyboard mounting section 210 is shaped like a horizontally oriented rectangle to locate the keyboard 13. The section 210 is formed lower than the top surface of the cabinet 11 by one step. In other words, the keyboard mounting section 210 is formed concavely toward the lower case 112 from the upper wall 211 of the upper case 111.

A main board 220 is located horizontally in parallel with the upper and lower cases 111 and 112 and in correspondence with the keyboard mounting section 210. The main board 220 is called a motherboard and has a top surface 221 and an undersurface 222. Assume here that the distance between the top surface 221 of the main board 220 and the upper wall 211 of the keyboard mounting section 210 is D1.

A connector 230 is provided on the top surface 221 of the main board 220. More specifically, the connector 230 is provided in a position on the main board 220, which corresponds to (faces) a position in the keyboard mounting section 210 in the upper case 111 of the cabinet 11.

A sub-board 240 called a daughterboard is inserted in the connector 230 in parallel with the main board 220. The sub-board 240 has a connector portion 240a at one end. The connector portion 240a is to be connected to the connector 230. The portion of the sub-board 240, which is located away from the connector portion 240a, is located in (corresponds to) the non-keyboard area 111b on the upper case 111 of the cabinet 11. In other words, the portion of the sub-board 240 is located on the upper case outside the keyboard mounting section 210 and in the longitudinal direction of the keyboard mounting section 210. The other end of the sub-board 240, which is opposed to the connector section 240a, extends toward the right side of the cabinet 11 (the right-side section 212 of the upper case 111).

The sub-board 240 incorporates a digital tuner unit 244. The digital tuner unit 244 is composed of a plurality of components including a first component 241, a second component 242 and a third component 243. The sub-board 240 has a top surface 245 on which the components including the first and third components 241 and 243 are arranged and an undersurface 246 on which the components including the second component 242 are arranged. The first component 241 is located away from the connector section 240a of the sub-board 240, while the third component 243 is located close to the connector section 240a.

Assume that the distance between the top surface 245 of the sub-board 240 and the top surface of the connector 230 is D2 and the distance between the undersurface 246 of the sub-board 240 and the undersurface of the connector 230 (or the interval between the undersurface 246 and the top surface 221 of the main board 220) is also D2 when the sub-board 240 is inserted in the connector 230. The height H0 of the connector 230 is therefore expressed by the following equation (1):

$$H0 = 2D2 + Ts \quad (1)$$

where Ts is the thickness of the sub-board 240.

The height (thickness) H0 (=2D2+Ts) of the connector 230 is restricted as given by the following formula (2):

$$H0 < D1 \quad (2)$$

In the present embodiment, H0 is 4.0 mm, D1 is 4.5 mm, D2 is 1.5 mm and Ts is 1.0 mm. The value (4.0 mm) of H0 satisfies the above equation (1).

Of all the components arranged on the sub-board 240, the component 241 is the highest (thickest) and its height H1 is, for example, 6.8 mm. Assume here that the height (thickness) H1 of the component 241 is greater than an interval between the top surface 245 of the sub-board 240 and the upper wall 211 of the upper case 111 corresponding to the keyboard mounting section 210 (or the upper wall 211 of the keyboard mounting section 210) when the sub-board 240 is inserted in the connector 230 (this will be referred to as a specific condition). Also, assume that the height H1 of the component 241 is smaller than the interval between the top surface 245 of the sub-board 240 and the upper wall 211 of the upper case 111 outside the keyboard mounting section 210 (or the upper wall 211 of the non-keyboard area 111b) under the specific condition described above. In other words, assume that the interval between the top surface 245 and the upper wall 211 is greater than the height H1 of the component 241.

The component 241 is located away from the connector portion 240a on the top surface 245 of the sub-board 240. Under the specific condition, the component 241 is located outside the keyboard mounting section 210 in the longitudinal direction of the section 210. More specifically, under the specific condition, the component 241 is opposed to the upper wall 211 between the keyboard mounting section 210 and the side section 212 (or the non-keyboard area 111b).

Assume here that the interval between the upper wall 211 of the keyboard mounting section 210 and the upper wall 211 of the non-keyboard area 111b is D3. In order to incorporate the sub-board 240 equipped with the digital tuner unit 244 including the component 241, the following formula (3) should be satisfied:

$$D1 + D3 > D2 + Ts + H1 \quad (3)$$

The height (thickness) H0 of the connector 230 is therefore restricted by the following formula (4) as is clear from the above formulae (1) and (3):

$$H0 < 2(D1 + D3 - H1) - Ts \quad (4)$$

In the present embodiment, D3 is 5.6 mm. The value (4.0 mm) of H0 satisfies the above formula (4).

The component 243 is located close to the connector 240a on the top surface 245 of the sub-board 240. Under the above specific condition, the position in which the component 243 is located corresponds to (faces) the keyboard mounting section 210 of the upper case 111 of the cabinet 11. In order to incorporate the sub-board 240 equipped with the digital tuner unit 244 including the component 243, if the height of the component 243 is H3, the distance (D2+Ts+H3) from the top surface 221 of the main board 220 to the top surface of the component 243 has to satisfy the following formula (5):

$$D2 + Ts + H3 < D1 \quad (5)$$

The height H0 of the connector 230 is therefore restricted by the following formula (6) as is clear from the above formulae (1) and (5):

$$H0 < 2(D1 - H3) - Ts \quad (6)$$

In the present embodiment, H3 is 1.5 mm. The value (4.0 mm) of H0 satisfies the above formula (6).

As described above, the height (thickness) H0 of the connector 230 is restricted by the above formulae (2), (4) and (6). With this restriction, the height H0 of the connector 230 is set to 4.0 mm.

On the other hand, the height H2 of the component 242 provided on the undersurface 246 of the sub-board 240 is, for example, 2.8 mm. The component 242 is located (mounted) at an end of the sub-board 240, which faces the side section 212 of the upper case 111, on the undersurface 246 of the sub-board 240. If the component 242 corresponds to (faces) the main board 220, the sub-board 240 cannot be incorporated. This means that under the above specific condition the height H0 (=4.00 mm) of the connector 230 is so determined that the distance D2 (=1.5 mm) between the top surface 221 of the main board 220 and the undersurface 246 of the sub-board 240 is smaller than the height H2 (=2.8 mm) of the component 242.

According to the present embodiment, under the specific condition, the component 242 is located outside the main board 220 on the undersurface 246 of the sub-board 240. Even though D2 is smaller than H2 (D2<H2), the sub-board 240 equipped with the digital tuner 244 including the component 242 can be incorporated and accordingly the cabinet 11 can be thinned further.

[Modification]

Figure 3:
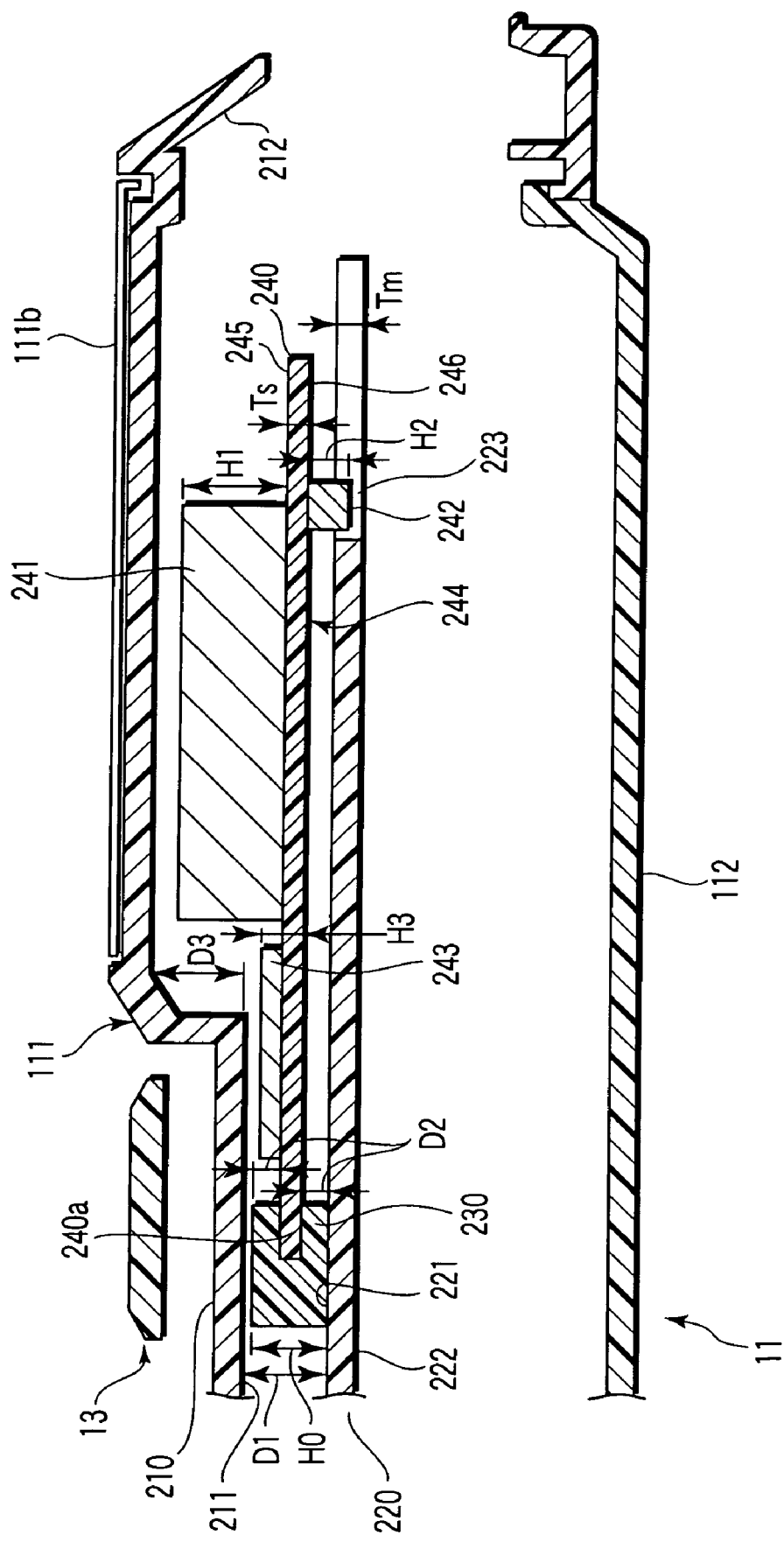
FIG. 3 is a sectional view of the main part of a personal computer according to a modification to the embodiment of the invention.

A modification to the above embodiment will be described. In the above embodiment, the right end portion of the main board 220 (an end portion facing the side section 212 of the upper case 111) is located closer to the connector 230 than the component 242, as shown in FIG. 2. In the modification, assume that the main board 220 is increased in size to use the inside of the cabinet 11 effectively. More specifically, assume that the main board 220 is incorporated to extend from a position corresponding to at least the keyboard mounting section 210 to a position corresponding to the upper wall 211 between the keyboard mounting section 210 and the side section 212 (or one of the paired side sections). FIG. 3 is a sectional view of the main part of a personal computer according to the modification to the personal computer shown in FIG. 1.

Referring to FIG. 3, the right end portion of the main board 220 comes closer to the right side of the cabinet 11 (the side section 212 of the upper case 111) and is located away from the connector 230 rather than the component 242, unlike in the above embodiment. In this state, the sub-board 240 cannot be inserted in the connector 230. The reason for this is that D2 is smaller than H2 (D2<H2).

According to the modification, the main board 220 is notched in correspondence with an area including a component (e.g., component 242) whose height is greater than D2, the component being one of the components arranged on the undersurface 246 of the sub-board 240. In FIG. 3, a notch 223 is formed in that portion of the main board 220 which faces the component 242.

The component 242 (which is mounted on the undersurface 246 of the sub-board 240) projects toward the lower case 112 exceeding at least the top surface 221 of the main board 220 through the notch 223. Even though the height H2 of the component 242 is greater than D2 (H2>D2) and the right end portion of the main board 220 is located away from the connector 230 rather than the component 242 (or even though the right end portion of the main board 220 is closer to the side section 212 of the upper case 111 than the component 242), the sub-board 240 can be inserted in the connector 230. Assuming that the thickness of the main board 220 is Tm and the height H2 of the component 242 is greater than D2+Tm (H2>D2+Tm), the component 242 projects toward the lower case 112 exceeding the undersurface 222 of the main board 220.

As described above, in the modification, the notch 223 is formed in that portion of the main board 220 which faces the component 242 in order to project the component 242 toward the lower case 112 exceeding the main board 220. However, an opening other than the notch 223, such as a through-hole, can be formed in the main board 220.

Te above embodiment and modification are based on the premise that the sub-board 240 including the digital tuner unit 244 is incorporated in the cabinet 11. However, the technique of incorporating a digital tuner unit, which is employed in the embodiment and modification, can be applied to all the electronic devices in which a circuit board whose height is restricted is incorporated in the cabinet including a keyboard mounting section.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions are changes in the form of the apparatuses and methods described herein may be made without departing from spirit of the inventions. The accompanying claims and their equivalents are intended to cover such forms or modifications as would fall within the scope and sprit of the inventions.

What is claimed is:

1. An electronic device comprising:
    a cabinet including a lower case and an upper case coupled to the lower case, the upper case having an upper wall and a keyboard mounting section on which a keyboard is mounted;
    a main board having a top surface and incorporated in the cabinet;
    a connector provided on the top surface of the main board; and
    a sub-board having a top surface and an undersurface and equipped with a digital tuner unit composed of a plurality of components including a first component and a second component, the sub-board having a connector portion which is inserted in the connector of the main board in parallel with each other, the first component having a greatest height of all of the components and being mounted on the top surface of the sub-board so as to face the upper wall outside a longitudinal direction of the keyboard mounting section.

2. The electronic device according to claim 1, wherein:
    the main board is incorporated in the cabinet such that the main board is opposed to at least the keyboard mounting section; and
    the connector is located in a position on the main board, the position corresponding to a position in the keyboard mounting section.

3. The electronic device according to claim 2, wherein the keyboard mounting section is formed concavely toward the lower case from the upper wall.

4. The electronic device according to claim 2, wherein a height of the connector is determined such that an interval between the top surface of the sub-board and the upper wall of the upper case becomes greater than a height of the first component.

5. The electronic device according to claim 4, wherein:
    the second component is mounted on the undersurface of the sub-board and outside the main board, the second component having a greatest height of all components mounted on the undersurface of the sub-board; and
    the height of the connector is determined such that an interval between the top surface of the main board and the undersurface of the sub-board becomes smaller than the height of the second component.

6. The electronic device according to claim 4, wherein:
    the main board is incorporated in the cabinet such that the main board is opposed to the keyboard mounting section and the upper wall of the upper case outside the keyboard mounting section;
    the sub-board has one end portion on the undersurface thereof in a direction opposite to the connector portion, the one end portion being opposed to the main board;
    the height of the connector is determined such that an interval between the top surface of the main board and the undersurface of the sub-board becomes smaller than a height of the second component; and the second component is mounted on the one end portion of the undersurface of the sub-board and projected toward the lower case exceeding the main board, the second component has a greatest height of all components mounted on the undersurface of the sub-board.

7. The electronic device according to claim 6, wherein:
the main board has an opening that is opposed to the second component; and
the second component projects toward the lower case through the opening, exceeding the main board.

8. An electronic device comprising:
a lower case;
an upper case coupled to the lower case and having an upper wall and a pair of side sections;
a keyboard mounting section provided on the upper case and formed concavely from the upper wall toward the lower case;
a main board incorporated between the upper case and the lower case and extending from a position corresponding to at least the keyboard mounting section to a position corresponding to the upper wall between the keyboard mounting section and one of the side sections; and
a sub-board on which a plurality of components are mounted, the sub-board being mounted on the main board in parallel with each other in such a manner that one of the components, which has a greatest height, is opposed to the upper wall between the keyboard mounting section and the one of the side section, wherein:
the sub-board has a top surface opposed to the upper case, an undersurface opposed to the main board, and an end portion on the undersurface and at the one of the side section,
the main board has an opening that is opposed to the one of the components, and
one of the components is mounted on the end portion and projects toward the lower case through the opening exceeding the main board.

9. An electronic device comprising:
a cabinet including a first case having a first wall and a second case coupled to the first case;
a keyboard on the first wall;
a first board in the cabinet having a top surface;
a connector on the top surface of the first board; and
a second board having a top surface and an undersurface and equipped with a digital tuner unit that comprises a plurality of components including a first component and a second component, the second board including a connector portion inserted in the connector of the first board, the first component being greater in width than the second component and being mounted on the top surface of the second board so as to face the upper wall outside a longitudinal direction of the keyboard mounting section.

* * * * *